INVENTOR.
ELWOOD F. INGLEDUE

April 26, 1955     E. F. INGLEDUE     2,707,143
GRAPHIC RECORDER

Filed June 16, 1949                                         4 Sheets-Sheet 4

INVENTOR.
ELWOOD F. INGLEDUE
BY
*Philip M. Dunson*
ATTORNEY

United States Patent Office 2,707,143
Patented Apr. 26, 1955

2,707,143

GRAPHIC RECORDER

Elwood F. Ingledue, Columbus, Ohio, assignor, by mesne assignments, to Thompson Products, Inc., Cleveland, Ohio, a corporation of Ohio Application June 16, 1949, Serial No. 99,399

5 Claims. (Cl. 346—32)

My invention relates to graphic recording of electrical signal strength, and particularly to means for continuously recording the pattern of a radio antenna in a given plane.

The usual method of measuring the relative field strength of a radio antenna in all directions in a given plane consists of transmitting a radio-frequency signal of constant carrier intensity from a fixed position and receiving the signal at a distant point, using the antenna under test as the receiving antenna and rotating it about an axis perpendicular to the given plane. The amplitude of the received signal is measured by means of a detector and amplifier connected to an electrical indicator. The indicator is constructed in such a manner that its recording pen moves in a straight line so that the amplifier output is recorded as the distance from a fixed point, or center, about which the polar coordinate paper rotates in synchronization with the rotation of the antenna under test. The resulting relative field strength record on polar coordinates is known as the "pattern" of the antenna in the given plane.

The foregoing method of recording antenna patterns is practicable if the detector used is linear, that is if its output is directly proportional to its input. The detectors most widely used, however, especially at ultra high frequencies, are bolometers and crystal detectors, which have a square-law characteristic; that is their output is proportional to the square of their input. Where such a detector is used it is necessary to compensate for the square-law action by "taking the square-root," either mechanically or electrically, somewhere in the recording system.

A mechanical means for obtaining a square-root characteristic in the recorder's pen movement can be constructed using cams. Such a mechanical system is expensive because of the cost of skilled machine work, and is not as accurate as it should be even where the tolerances on the cams are very small. An electronic means of compensating for the square-law detector comprises the use in the vacuum-tube amplifying system of an amplifier having a square-root characteristic; that is a characteristic whereby the output is proportional to the square-root of the input. Such an amplifier is expensive, takes much time to construct, requires skillful adjustment and frequent calibration, and is not as accurate as is desirable. Another means for obtaining the desired square-root effect employs a servo-mechanism connected to the arm of a specially-wound potentiometer so as to match the voltages on the grids of a balance detector. The square-root characteristic is obtained by varying the spacing in the winding of the potentiometer. The special winding obviously makes such a potentiometer expensive.

A primary object of my invention is to provide a recorder of electrical signal strength in which a square-law detector can be used, a compensating square-root action being obtained by means of a unique electrical circuit in combination with a servo-mechanism.

Another object is to provide means for obtaining said square-root action using apparatus less expensive than that described above, yet capable of greater accuracy than is normally obtained by the methods described above.

A further object is to provide a unique electronic circuit using linear potentiometers to obtain square-roots and higher roots in a recorder of electrical signal strength.

Another object is to provide a circuit wherein ganged linear potentiometers are connected in such a manner as to perform functions normally requiring a special potentiometer wound such that the resistance between the arm and one end varies as the square of the angle between the arm and an end position of the arm.

Inertia in the moving parts of a recording system may cause phenomena known as "overshoot" and "hunting" which are hereinafter described and which introduce inaccuracies. An additional object of my invention is to incorporate in the electronic circuit of the recorder means to minimize overshooting and hunting.

Other objects and advantages of the invention are apparent from the detailed description.

In the accompanying drawings, forming a part of this specification, in which like reference characters designate like parts throughout, Figure 1 is a block diagram illustrating the components of, and their operation in, a recorder of electrical signal strength embodying my invention.

Figure 1:
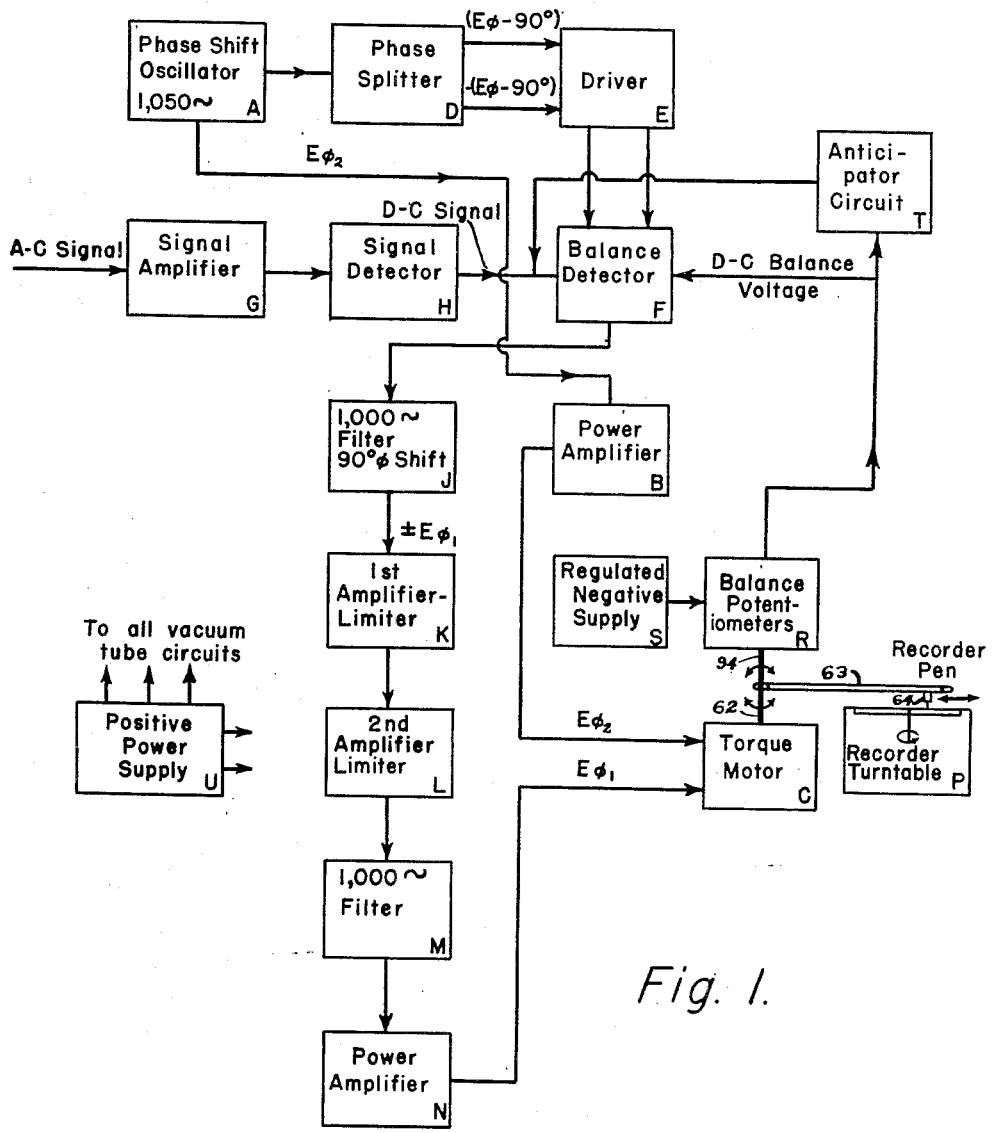
Figure 2:
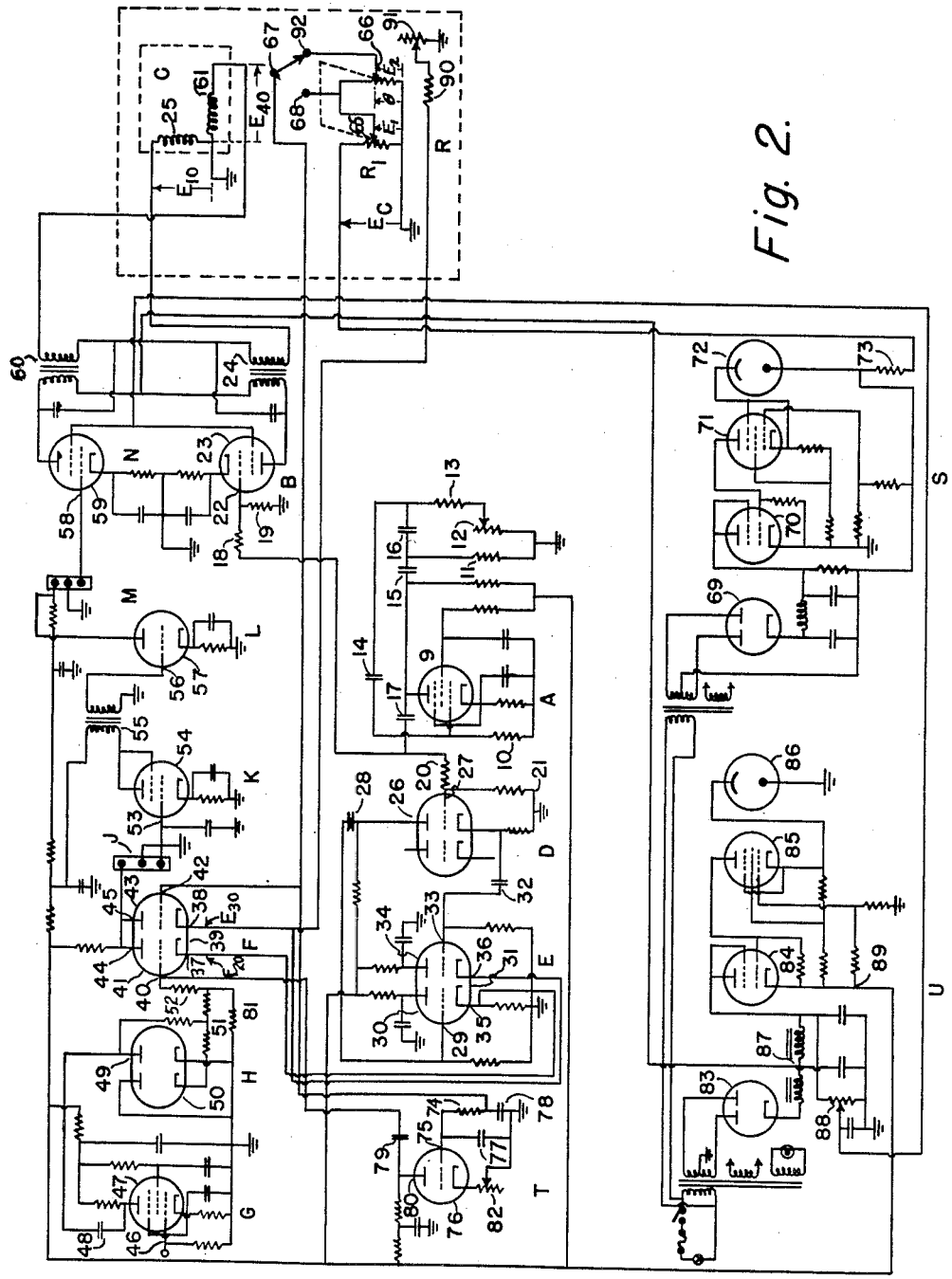
Figure 2 is a schematic circuit diagram of the recorder shown in Figure 1.

Referring to Fig. 1 and Fig. 2, phase-shift oscillator A, uses a type 6SJ7 pentode tube 9, in a three-mesh feedback circuit with resistors 10, 11, 12, and 13, and condensers 14, 15 and 16 providing a frequency of approximately 1050 cycles per second. By adjusting resistance 12, the frequency can be made to vary over a 200-cycle range. The output of phase-shift oscillator A is coupled through condenser 17 to a divider network consisting of resistors 18 and 19, and to another network consisting of resistors 20 and 21. The output voltage is a sine wave having a root-mean-square value of approximately 60 volts. The voltage at the grid 22 of type 6AR6 tetrode tube 23 of power amplifier B is approximately 27 volts. This is the maximum drive voltage that can be used without appreciable distortion in this stage. The output of power amplifier B, which is constant in amplitude and phase, is coupled through transformer 24 to constant-phase winding 25 of two-phase drag-cup torque motor C, providing voltage E-10 across the constant-phase winding 25.

Phase-splitter D, using one section of type 6SN7 dual triode tube 26, is driven at grid 27 by approximately 0.3 volt from phase-shift oscillator A. The output of phase-splitter tube 26 comprises two voltages of equal amplitude, but differing in phase by 180°. The plate output of phase-splitter tube 26 is coupled through condenser 28 to the grid 29 of the left-hand section 30 of type 6SN7 dual triode tube 31 of driver E. The cathode output of phase-splitter tube 26 is coupled through condenser 32 to the grid 33 of the right-hand section 34 of driver tube 31.

Driver stage E supplies the driving voltages to balance detector F from cathodes 35 and 36 of tube 31 to cathodes 37 and 38, respectively, of type 6SN7 dual triode tube 39. The voltage on cathode 37 is equal to, and 180° out of phase with, the voltage on cathode 38. The voltage E-20 at cathode 37 is in phase with the voltage E-10 across the constant-phase winding 25 of two-phase torque motor C, and the voltage E-30 at cathode 38 is 180° out of phase with constant voltage E-10. When the potential at grid 40 of left-hand section 41 of tube 39 is equal to the potential at grid 42 of the right-hand section 43 of tube 39, the current in left-hand section 41 is equal to, and 180° out of phase with, the current in right-hand section 43. Since plate 44 of left-hand section 41 is tied to plate 45 of right-hand section 43, the combined plate current is zero.

Assume now that an increased signal voltage is applied to the grid 46 of type 6SJ7 pentode tube 47 of signal amplifier G. This signal voltage can be an alternating-current input of any frequency between 100 and 60,000 cycles per second. Tube 47 provides linear amplification with a voltage gain of approximately 100. The output of signal amplifier G is coupled through condenser 48 to plate 49 of type 6H6 dual diode tube 50 of signal detector H. Tube 50 acts as a compensated detector providing direct-current output which is linear, within 1%, over the entire range. This output is fed through the divider network comprising resistors 51 and 52 to the grid 40 of the left-hand or signal section 41 of balance-detector tube 39. The left-hand section 41 is now conducting a smaller current than is the right-hand section 43, so the combined plate current is no longer is zero, but has a finite value and provides an output voltage 180° out of phase with cathode voltage E–20 (and with voltage E–10). If the signal voltage to grid 46 of signal amplifier tube 47 were decreased, the current in the left-hand or signal section 41 of balance detector tube 39 would be more than the current in the right-hand section 43, and the output voltage of balance-detector tube 39 would be 180° out of phase with cathode voltage E–30 (but in phase with voltage E–10). In other words, any output voltage of balance-detector tube 39 will be either in phase with, or 180° out of phase with, the constant voltage E–10 across winding 25 of torque motor C.

The output of balance-detector F is connected to 1000-cycle band-pass filter J. Filter J serves two purposes: First, it minimizes any second harmonics. Second, it provides a phase shift of 90°. This phase shift is controlled by varying resistance 12, which controls the frequency of phase-shift oscillator A. Because of this 90° phase shift the output of filter J leads voltage E–10 by 90° when the input to signal amplifier G is increased, and lags voltage E–10 by 90° when the input to signal amplifier G is decreased.

The output of filter J is applied to grid 53 of type 6K6–GT tetrode tube 54 of first amplifier-limiter K. When large inputs occur at grid 53, grid current flows and a blocking or limiting action is present in tube 54. The output of the first amplifier-limiter K is coupled through transformer 55 to grid 56 of type 6C5 triode tube 57 of second amplifier-limiter L. Except when the input to the first amplifier-limiter K is very small, a blocking or limiting action takes place both in first-amplifier-limiter tube 54 and in second-amplifier-limiter tube 57, and the ouput of the second amplifier-limiter L is substantially a square wave.

The output of second amplifier L is fed through another 1000-cycle band-pass filter M. Since filter M is a sharply tuned circuit, its output is a sine wave, which produces maximum torque in torque motor C. The output of filter M is fed to grid 58 of type 6AR6 tetrode tube 59 of power amplifier N. The output of power amplifier N is coupled through transformer 60 to winding 61 of two-phase torque motor C, providing voltage E–40 across the winding 61. Torque motor C will run when, and only when, windings 25 and 61 are both energized at quadrature, so it is desirable for maximum torque that the voltage E–10 across constant-phase winding 25 and the voltage E–40 across winding 61 be 90° out of phase. Voltage E–40 is in phase with the output voltage of filter J, so voltage E–40 leads E–10 by 90° when the input to signal amplifier G is increased and voltage E–40 lags voltage E–10 by 90° when the signal input to amplifier G is decreased. Torque motor C runs clockwise in the former case and counterclockwise in the latter case.

Figure 5:
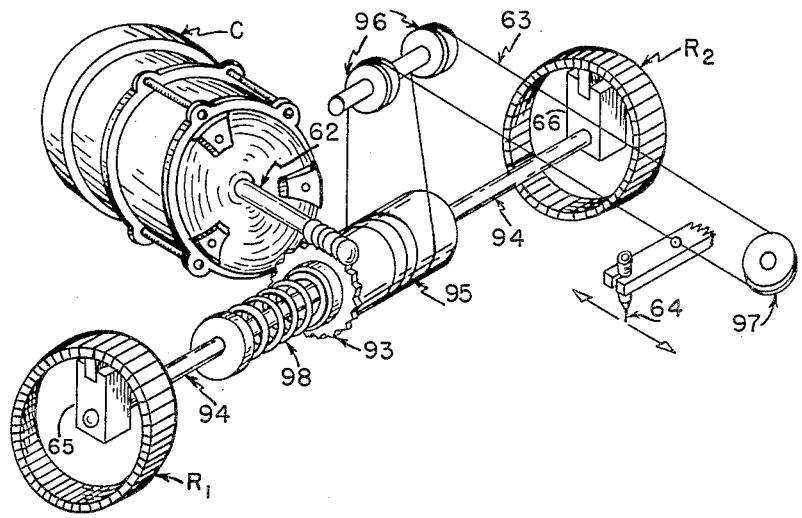
Figure 5 is a perspective view of the recording pen and the moving parts involved in controlling its position.

The shaft 62 (see Fig. 5) of torque motor C is geared to pulley 63 wound on drum 95 and around wheels 96 and 97 and connected to recording indicator pen 64, causing pen 64 to move away from the center of recorder turntable P (see Fig. 1) as the input to signal amplifier G is increased, and to move back toward the center of recorder turntable P as the signal to amplifier G is decreased. The recorder turntable P rotates in synchronization with the rotation of the receiving antenna (not shown) whose pattern is to be recorded. This antenna supplies a modulated radio-frequency signal that is detected and amplified before it is applied to grid 46 of signal amplifier tube 47. Torque motor shaft 62 is connected through worm gear 93 and clutch 98 to the shafts 94 of ganged linear potentiometers R–1 and R–2 of balance potentiometer circuit R.

Let the potentiometer arm position be designated as $\theta$, where $\theta$ is the fraction of $R_1$ between arm 65 and ground (which is also the fraction of $R_2$ between arm 66 and ground) variable from zero when the arms 65 and 66 are at the grounded end of potentiometers R–1 and R–2, to one when arms 65 and 66 are at the end away from ground on potentiometers R–1 and R–2. Since R–1 and R–2 are linear potentiometers $\theta$ is also the fractional angular position of ganged arms 65 and 66. For linear recording the single-pole double-throw switch 67 is connected to contact 68. Used in conjunction with balance potentiometer circuit R is a 220–volt electronically regulated negative supply S, of conventional design, comprising a type 5V4 full-wave rectifier 69, a type 6Y6 tetrode tube 70, a type 6SJ7 pentode tube 71, and a type VR–150 voltage-regulator tube 72. The output of regulated negative supply S is connected through resistor 73 to potentiometer R–1 providing approximately 7 volts constant negative voltage $E_c$ across potentiometer R–1. Voltage E–1 between arm 65 and ground is fed through switch 67 to grid 42 of the right-hand or balance section 43 of balance-detector tube 39. As the input to signal amplifier G increases causing torque motor C to turn clockwise, the position $\theta$ of potentiometer arm 65 increases until the voltage E–1 applied to grid 42 equals the voltage $E_s$ at grid 40. When E–1 equals $E_s$, the combined plate current of balance-detector tube 39 is zero (balance exists), voltage E–40 across winding 61 becomes zero, and torque motor C stops. Since R–1 is a linear potentiometer, voltage E–1 is proportional to potentiometer arm position $\theta$. For balance E–1 equals $E_s$, so at balance $\theta$ is proportional to $E_s$ and to the input to signal amplifier G. The turning of shaft 62 in producing balance moves pulley 63, causing recorder pen 64 to move away from the center of recorder turntable P in proportion to the input to signal amplifier G; as this input decreases the same actions take place, but all in the opposite directions. Cathode 38 of balance detector tube 39 is connected to resistor 90 in series with adjustable resistance 91, which is connected to ground. Adjustable resistance 91 controls the zero-signal position of recorder pen 64.

First amplifier-limiter K and second amplifier-limiter L are designed to furnish sufficient drive to power amplifier N that winding 61 of torque motor C is adequately energized to cause torque motor C to follow even small changes in signal voltage $E_s$. The blocking or limiting action in first amplifier-limiter K and second amplifier-limiter L limits the input to power amplifier tube 59 and prevents blocking in that stage. The system is sensitive enough to follow small changes in the input to signal amplifier G, and with properly adjusted turntable speed is fast enough to follow quick changes of input to signal amplifier G, including a full-scale step function, with negligible time lag.

In a recorder of this type when the signal voltage $E_s$ changes rapidly the inertia in the mechanical system may cause the torque motor C to continue in motion beyond the point where balance is reached. This action is called overshooting. When overshoot occurs potentiometer arm 65 is moved beyond the balance point and torque motor C is energized so as to reverse its direction. The inertia may cause the motor to turn past the balance position again and to oscillate about the balance point. This phenomenon is called hunting.

*Anticipator circuit*

Overshoot and hunting are minimized by anticipator circuit T. The balance voltage E–1 applied to grid 42 of balance detector tube 39 is connected also through resistor 74 to grid 75 of type 6J5 tube 76. Resistor 74 and condensers 77 and 78 in the grid circuit of anticipator amplifier tube 76 form a filter to keep out stray voltages. The balance voltage E–1 changes relatively slowly and is not affected by the filter action. The change in balance voltage E–1 is amplified in the plate circuit of anticipator amplifier tube 76 and is fed through condenser 79 to the grid 40 on the left-hand or signal side 41 of balance detector tube 39. The current through condenser 79 is proportional to the rate of change of voltage at plate 80 of anticipator tube 76, which is proportional to the rate of change of balance voltage E–1. This current through condenser 79 flows through resistor 52 and resistor 81 to ground. The IR drop across resistors 81 and 52, which constitutes the feedback voltage to grid 40 on the left-hand or signal side 41 of balance detector tube 39, consequently is proportional to the rate of change of balance voltage E-1. As E-1 increases in magnitude to follow an increase in the magnitude of signal voltage Es the voltage fed back to grid 40 subtracts from (opposes) the signal voltage Es so that an apparent balance is reached before E-1 reaches the magnitude of Es. The inertia in the mechanical system causes torque motor C to run beyond this apparent balance point to the actual balance point. Between the apparent and actual balance points torque motor C is braked by the counter-torque produced by the feed-back voltage. When torque motor C stops, balance voltage E-1 ceases to change, so the feed-back voltage decreases to zero, and since balance exists, no counter-torque is produced to cause hunting. When balance voltage E-1 decreases in magnitude to follow a decrease in the magnitude of signal voltage Es the action is the same except that the feed-back voltage to grid 40 is reversed thus opposing the decrease in signal voltage Es. The feed-back voltage is proportional to the rate of change of balance voltage E-1 which is proportional to the speed of torque motor C, so the feed-back or braking voltage increases and decreases according to the inertia that it must counteract. Adjustable cathode resistance 82 controls the amount of feed-back voltage and can be adjusted to provide proper braking action throughout the speed range of torque motor C.

Plate and screen voltages for all of the vacuum-tube circuits in the recorder are furnished by positive power supply U, of conventional design, comprising type 5R4 fullwave rectifier tube 83, type 6L6 beam power tetrode tube 84, type 6SJ7 pentode tube 85, and type VR-150 voltage-regulator tube 86. Five-hundred fifty volts unregulated are supplied from points 87 and 88 to the plates and screen grids respectively of power amplifier tubes 23 and 50. All other stages receive necessary plate and screen voltage from the 220-volt electronically-regulated output at point 89. The regulated voltage is constant within 0.5% for line-voltage variations between 95 and 130 volts. The use of regulated positive power supply U results in stable operation and smooth movement of recorder pen 64. Variations in plate and screen voltages in power amplifier tubes 23 and 59 do not affect the stability nor the accuracy of the system.

Recorder turntable P is operated by a selsyn motor (not shown) electrically connected to a selsyn generator which is mechanically connected to the rotating mechanism used to rotate the antenna whose pattern is being measured. To maintain a high degree of accuracy between the recorder turntable P and the antenna rotating mechanism the selsyns preferably operate through a gear ratio of at least 36 to 1. Common ratios in use are 36 to 1, 40 to 1 and 100 to 1. Angular accuracy within 1 degree can be maintained in the selsyns, providing accuracy within $\frac{1}{36}$ degree or better between recorder turntable P and the antenna rotating system. Allowing for reasonable end play in the gears and in the selsyns, accuracy within 0.1 degree can be expected.

*Square-root circuit*

Figure 3:
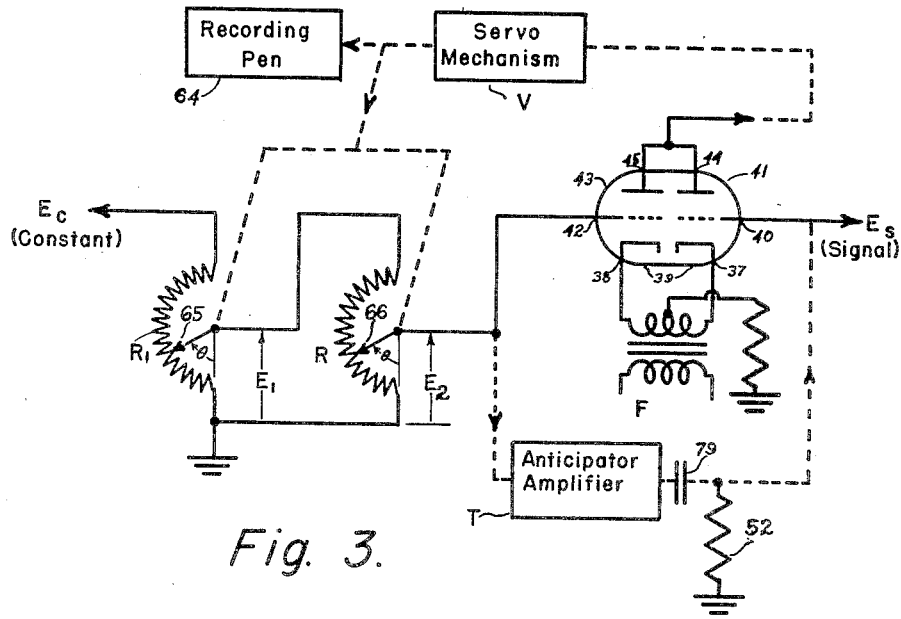
Figure 3 is a diagram schematically illustrating a preferred form of the ganged potentiometer circuit according to my invention in combination with a typical form of anticipator circuit according to my invention and other components of the recorder represented in part in block-diagram fashion.

When single-pole double-throw switch 67 is connected to contact 92 (instead of to contact 68) there is brought into operation the square-root circuit that constitutes an important part of my invention. Balance voltage $E_1$, instead of being connected directly to grid 42 on the balance side of balance-detector tube 39, is connected only across the ends of potentiometer $R_2$ which is ganged on the same shaft with potentiometer $R_1$. The voltage $E_2$ between ground and arm 66 of potentiometer $R_2$ now is connected to grid 42 on the balance side of balance-detector tube 39. Referring to Fig. 3, where $\theta$ has already been defined to be the fractional resistance-encompassing, or angular, position of the ganged potentiometer arms 65 and 66 (that is $\theta$ is the fraction of their full-voltage position), it is apparent that:

$$E_1 = \frac{\theta R_1}{R_1} E_c = \theta E_c$$

and $$E_2 = \frac{\theta R_2}{R_2} E_1 = \theta E_1$$

or $$E_2 = \theta^2 E_c$$

so $$\theta = \sqrt{\frac{E_2}{E_c}}$$

or, since $E_c$ is constant, the last equation above can be expressed as $$\theta = k\sqrt{E_2}$$

For balance $$E_2 = E_s$$

so $$\theta = k\sqrt{E_s}$$

This last equation means that since servo-mechanism V (comprising the torque motor C and its associated electronic circuit A B, D, . . . N) continuously varies ganged potentiometer arm position $\theta$ for balance (equality) between $E_2$ and $E_s$, then said ganged potentiometer arm position $\theta$ varies as the square-root of $E_s$. Since $E_s$ is directly proportional to the input to signal amplifier G, ganged potentiometer arm position $\theta$ is proportional to the square-root of said input. The connection of ganged potentiometer shaft 62 through pulley 63 to recording pen 64 causes the distance between the recording pen 64 and the center of recorder turntable P to vary as the square-root of the input to signal amplifier G. If this input is the square of the voltage from the antenna being measured, the trace of recording pen 64 on a sheet of paper (not shown) placed on the synchronously-revolving recorder turntable P is a true polar-coordinate record of the voltage pattern (relative field strength pattern) of the antenna in the plane of rotation.

The foregoing equations, while nearly exact, involve an approximation since the resistance $R_2$ is in parallel with the lower portion $\theta R_1$ of potentiometer $R_1$. Consider the exact equation, $$E_1 = \left[ \frac{\frac{\theta R_1 R_2}{\theta R_1 + R_2}}{\frac{\theta R_1 R_2}{\theta R_1 + R_2} + R_1 - \theta R_1} \right] E_c$$

Let $R_2$ be ten or more times as great as $R_1$, that is let $$R_2 = AR_1 (A \geq 10)$$

Substituting, the first equation reduces to $$E_1 = \left[ \frac{1}{\frac{1}{A} + \frac{1}{\theta} - \frac{\theta}{A}} \right] E_c$$

Since $$E_2 = \theta E_1$$

then $$E_2 = \left[ \frac{1}{\frac{1}{A} + \frac{1}{\theta} - \frac{\theta}{A}} \right] \theta E_c$$

To produce a perfect square-root recording function the equation should be $$E_2^1 = \theta^2 E_c$$

the percent error (let it be called "$e$"), then, is $$e = \frac{E_2^1 - E_2}{E_2^1} \times 100\%$$

$$= \frac{\left[ \theta^2 - \frac{\theta^2}{\frac{\theta}{A} + 1 - \frac{\theta^2}{A}} \right] E_c}{\theta^2 E_c} \times 100\%$$

$$= \left[ 1 - \frac{A}{A + \theta - \theta^2} \right] \times 100\%$$

To determine the maximum error, solve $$\frac{de}{d\theta} = \frac{(2\theta - 1)A}{(A + \theta - \theta^2)^2} = 0$$

which shows that for maximum error $$\theta = 0.5$$

and $$e_{max.} = \frac{0.25}{A+0.25} \times 100\%$$

for $A=10$ (that is when $R_2$ is ten times $R_1$)

$$e_{max} = 2.5\%$$

which is the maximum error obtained in practice when $A=10$. Accuracy can be increased by increasing the ratio $A$ of $R_2$ to $R_1$, but for most purposes the increased accuracy is not required. Anticipator circuit T functions in the same manner as before, providing a feed-back voltage proportional to the rate of change of $E_2$.

Figure 4:
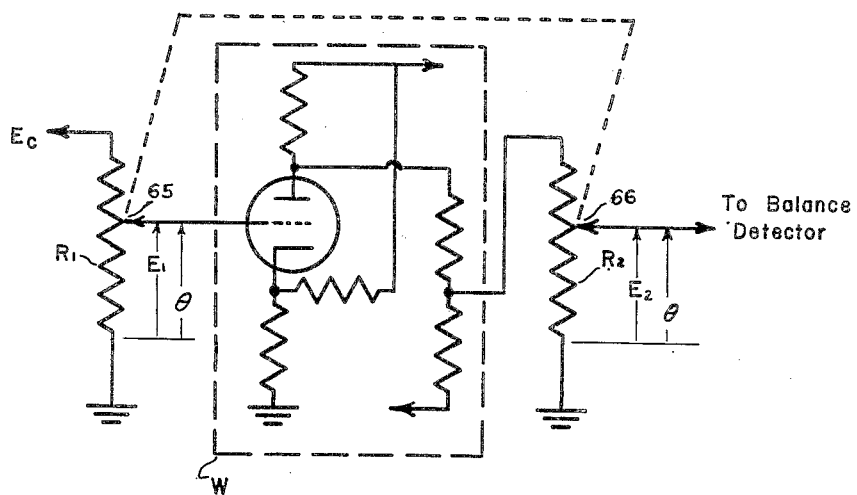
Figure 4 is a schematic diagram of a modified form of the ganged potentiometer circuit contained in Figure 3.

The second potentiometer $R_2$ can be isolated from the first potentiometer $R_1$ by inserting a linear direct-current amplifier W between $R_1$ and $R_1$ as shown in Fig. 4. For this circuit the first equations (ending with $\theta = k\sqrt{E_s}$) are exact and the error discussed above is eliminated.

Figure 6:
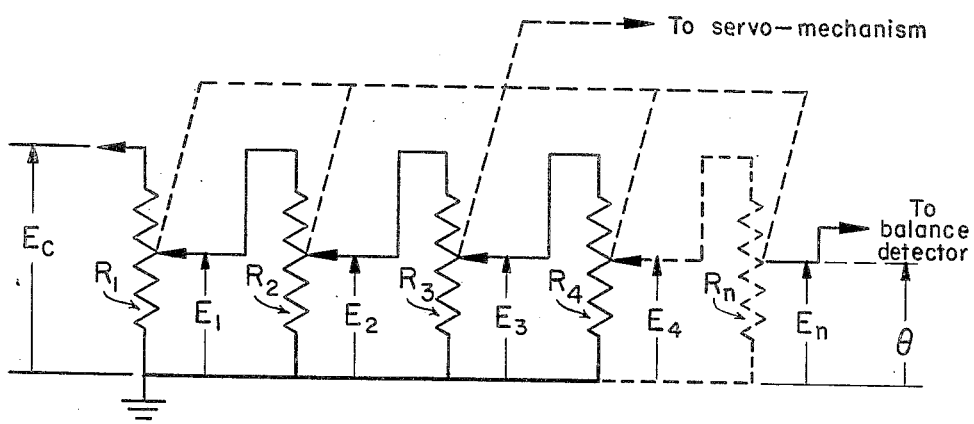
Figure 6 is a schematic diagram illustrating a modified form of ganged potentiometer circuit capable of providing proper voltages not only for linear and square-root recording but also for cube-root to $n$th root recording.

Cube-root, fourth-root, and so on to $n$th-root response can be obtained by adding more ganged potentiometers in the manner shown in Fig 6. Using the approximate equations we have $$E_1 = \theta E_c$$
$$E_2 = \theta E_1 = \theta^2 E_c$$
$$E_3 = \theta E_2 = \theta^3 E_c$$
$$E_4 = \theta E_3 = \theta^4 E_c$$

and if potentiometers are added in the same manner we can generalize by writing $$E_n = \theta E_{n-1} = \theta^n E_c$$

which shows that $n$th potentiometer provides $n$th-root recording.

It is to be understood that the form of my invention shown and described herein is merely a preferred example and is not intended to illustrate all of the equivalent forms or ramifications of my invention. Various changes, such as recording on cartesian coordinates using a strip chart, recording physical, chemical, or electrical data other than antenna field strengths, and using alternating-current signal and balance voltages, may be made without departing from the spirit of my invention or the scope of the following claims.

I claim:

1. In a graphic recorder of electrical signal strength controlled by a servo-mechanism providing matching between signal voltage and balance voltage in a balance detector, an input voltage substantially proportional to the movement of said servo-mechanism fed to an anticipator circuit comprising an amplifier portion whose output is substantially proportional to said input voltage and a capacitance and a resistance in series, across which series circuit the output of said amplifier portion is connected, and electrical conductors feeding the voltage across the resistance portion of said series circuit to the same side of said balance detector to which said signal voltage is fed and in phase opposition to said signal voltage, whereby said signal voltage is opposed by a voltage (across said resistance portion) substantially proportional to the rate of change of the movement of said servo-mechanism, and overshoot and hunting are minimized by the counter-torque set up by said opposing voltage against the inertia in the servo-mechanism.

2. A graphic recorder of electrical signal strength comprising an audio-frequency oscillator driving a power amplifier which energizes one winding of a two-phase drag-cup torque motor, a phase-splitter fed by said oscillator and supplying equal and opposite audio-frequency voltages to a driver stage which supplies said voltages amplified to a dual-tube balance detector, an audio-frequency signal input whose magnitude is to be recorded feeding a signal amplifier which feeds the amplified signal to a signal detector feeding its direct-current detected-signal voltage output to the control grid in one section (called the signal section) of said dual-tube balance detector, a band-pass filter through which the output of said balance detector is fed with a 90-degree phase shift to at least one amplifier-limiter feeding another band-pass filter which supplies substantially a sine-wave drive voltage to a power amplifier which energizes the other winding of said two-phase torque motor, a pulley geared to the shaft of said torque motor to provide straight-line movement in a recording indicator proportional to the rotation of said torque motor, said recording indicator being movable along a radius of a circle about whose center a turntable to which a recording sheet is affixed is caused to rotate as a predetermined function of a parameter whose effect on said signal input is to be recorded, a pair of ganged linear potentiometers geared to said torque motor shaft and fed by a substantially constant input voltage feeding an output voltage proportional to the square of their fractional arm position to the control grid in the other section (called the balance section) of said dual-tube balance detector, and an anticipator circuit feeding a voltage proportional to the rate of change of said potentiometer output voltage to the control grid in said signal section of said balance detector in opposition to said detected-signal voltage, whereby said recording indicator moves in proportion to the square-root of said audio-frequency signal input, and overshoot and hunting are minimized by the counter-torque set up against the inertia in the mechanical system by the opposition voltage fed to said balance detector by said anticipator circuit.

3. The combination of claim 2 in which said substantially constant input voltage is applied across the ends of one of said ganged linear potentiometers, the voltage between the arm and one end of said potentiometer is applied across the ends of the other potentiometer, and said output voltage proportional to the square of their fractional arm position is the voltage between the arm and one end of said latter potentiometer.

4. The combination of claim 2 in which said anticipator circuit comprises an amplifier portion, to which said output voltage from said potentiometers is fed and whose amplified output is substantially proportional to said potentiometer output voltage, and a capacitance and resistance in series, across which series circuit the output of said amplifier portion is connected and from which series circuit the voltage across said resistance, which is proportional to the rate of change of said potentiometer output voltage, is connected to the control grid in said signal section of said balance detector in opposition to said detected-signal voltage.

5. In a servo system for controlling the position of a movable element in accordance with an input electrical signal, an electro-mechanical transducer mechanically coupled to the element, a balance detector having an output electrically coupled to said transducer and having two separate inputs with the output of said detector being responsive to the differential between signals applied to said inputs, means for coupling an input signal to one of said inputs, means for developing a balance signal responsive to the position of the movable element, means for applying said balance signal to the other of said inputs, and an anticipator circuit having an input coupled to said balance signal and an output coupled to said one of said inputs of said balance detector, said anticipator circuit including an amplifier and a differentiating circuit and being arranged to apply to said one of said inputs an amplified signal responsive to the rate of change of said balance signal and out of phase with the input signal.

References Cited in the file of this patent

UNITED STATES PATENTS

| | | |
|---|---|---|
| 1,858,364 | Koening, Jr. | May 17, 1932 |
| 1,973,453 | Whiting | Sept. 11, 1934 |
| 2,113,436 | Williams | Apr. 5, 1938 |
| 2,207,821 | Robinson | July 16, 1940 |
| 2,220,055 | Fischel et al. | Oct. 29, 1940 |
| 2,270,732 | Jones | Jan. 20, 1942 |
| 2,300,742 | Harrison et al. | Nov. 3, 1942 |
| 2,352,953 | Haight | July 4, 1944 |
| 2,367,746 | Williams | Jan. 23, 1945 |
| 2,371,415 | Tolson | Mar. 13, 1945 |
| 2,376,599 | Jones | May 22, 1945 |
| 2,385,641 | Peterson | Sept. 25, 1945 |
| 2,410,289 | Kellogg | Oct. 29, 1946 |
| 2,454,520 | Moore, Jr. | Nov. 23, 1948 |
| 2,475,779 | Crosby | July 12, 1949 |
| 2,559,383 | Wills | July 3, 1951 |
| 2,593,950 | Williams, Jr. | Apr. 22, 1952 |

OTHER REFERENCES

"Analysis and Design of Translator Chains," by H. Ziebolz; published by Askania Regulator Co., Chicago, Illinois, September 25, 1946; vol. 1, pp. 227–228; vol. 2, Fig. 336.

"Electronic Instruments," Greenwood, Jr., Holdam, Jr., and Macrae, Jr. (vol. 21 of M. I. T. Radiation Laboratory Series), McGraw-Hill Book Co., Inc., 1948, pp. 120–122.